United States Patent [19]

Marois

[11] Patent Number: 5,441,710

[45] Date of Patent: Aug. 15, 1995

[54] AIR FLOW STERILIZER

[76] Inventor: Jean-Luc Marois, P.O. Box 304, St-André East Province of Quebec, Canada, J0V 1X0

[21] Appl. No.: 169,305

[22] Filed: Dec. 17, 1993

[51] Int. Cl.⁶ .............................................. B01D 50/00
[52] U.S. Cl. .................................... 422/307; 422/120; 422/122; 422/199; 392/485; 55/525; 55/526
[58] Field of Search ............... 422/125, 307, 199, 174, 422/4, 22, 122, 120; 392/492, 493, 485; 55/525, 526, 269

[56] References Cited

U.S. PATENT DOCUMENTS

| | | | |
|---|---|---|---|
| 1,335,021 | 3/1920 | Papini | 392/485 |
| 1,912,657 | 6/1933 | Quam | 55/526 X |
| 2,873,071 | 2/1959 | Bratton | 422/4 X |
| 3,278,256 | 10/1966 | Skaller | |
| 3,757,495 | 9/1973 | Sievers | |
| 4,246,235 | 1/1981 | Rogers | 422/178 X |
| 4,286,140 | 8/1981 | Dewulf et al. | 392/493 |
| 4,427,418 | 1/1984 | Kogiso et al. | 422/178 X |
| 4,456,457 | 6/1984 | Nozawa et al. | 422/178 X |
| 4,516,993 | 5/1985 | Takeuchi et al. | 422/178 X |
| 4,523,935 | 6/1985 | Takagi et al. | 422/178 X |
| 4,536,642 | 8/1985 | Hamster et al. | 392/492 |
| 4,563,571 | 1/1986 | Koga et al. | 392/493 |
| 4,682,992 | 7/1987 | Fuchs | |
| 4,707,167 | 11/1987 | Saito et al. | |
| 4,764,346 | 8/1988 | Lewis | 422/120 |
| 4,824,363 | 4/1989 | Abthoff et al. | 422/4 X |
| 4,900,434 | 2/1990 | Schade | 210/189 |
| 4,931,654 | 6/1990 | Horng | |
| 4,973,459 | 11/1990 | Lippert et al. | 423/244 |

Primary Examiner—James C. Housel
Assistant Examiner—Rachel Freed
Attorney, Agent, or Firm—Galgano & Burke

[57] ABSTRACT

An air flow containing microorganisms including fungal spores is sterilized by heating the air flow to a sufficient temperature to weaken cellular walls of the microorganisms, inducing turbulence in the air flow; and providing in the air flow sufficient contact surface against which the microorganisms may hit and be destroyed at a flow rate and turbulence level of the air flow.

14 Claims, 3 Drawing Sheets

AIR FLOW STERILIZER

FIELD OF THE INVENTION

The present invention relates to a method and apparatus for sterilizing a microorganism containing air flow.

BACKGROUND OF THE INVENTION

Air for breathing is typically supplied from high pressure medical air tanks, while lower pressure compressors are used to supply air for dentists and surgeons. This lower pressure air is typically filtered either before or after ambient air is compressed for use in drying or cleaning during operations.

In the dental environment, pressurized air is used to dry teeth and gums after rinsing, and typically the air is sprayed on small open wounds or bleeding gums. It is imperative to ensure that the air is free of any living microorganisms. Airborne microorganisms including especially fungal spores are difficult to filter out with perfect certainty and without expensive filter maintenance. Fungal infections can be transmitted by spores blown into oral wounds or by airborne spores exposed to open wounds in a hospital environment.

When air is heat treated for sterilization, the air must remain at a relatively high temperature (above 100° C.) for most microorganisms to be destroyed, spores requiring much long exposure to high temperature for sterilization. This length of time is not very practical in an air flow system.

SUMMARY OF THE INVENTION

It is an object of the invention to provide an air flow sterilizer which is practical and adequately destroys microorganisms in the air flow to make it safer for medical and dental use.

It is a further object of the invention to provide an air flow sterilizer which destroys microorganisms by heat and physical contact.

According to the invention, there is provided a sterilization apparatus for a microorganism containing air flow comprising means for heating the air flow to a sufficient temperature to weaken cellular walls of microorganisms, and turbulence means connected to the heating means for providing in the air flow sufficient turbulence and contact surface against which the microorganisms may hit and be destroyed at the temperature and at the flow rate of the air flow. The turbulence means have an outlet for the air flow containing destroyed microorganisms. It is possible to filter the air before entering the apparatus to trap microorganisms, and it is also possible to filter the air at the outlet to trap destroyed microorganisms for more pure air flow.

The turbulence means have physical characteristics which depend of the flow rate, temperature and pressure of the air flow. It has been found that larger objects, such as ceramic shards can be used to induce sufficient turbulence to cause particles or microorganisms in the air to contact the shards and be destroyed. It has also been found that the same effect is obtained using a stainless steel shavings or wool having a filament size of about 0.2 mm. The metal wool causes turbulence on a much smaller scale and presents much smaller contact surface, however, the result is the same, namely the microorganisms are causes to make contact with the surface and are destroyed.

Preferably, the heating means comprise a cylindrical chamber having an outer cylindrical wall, and a plurality of electric resistance heating elements provided in the cylindrical chamber which has an inlet at one end and an out port at another end. And the turbulence means may also comprise a cylindrical spiral chamber which shares its inner wall with the outer cylindrical wall of the heating means and has one end communicating with the out port and another end communicating with the outlet.

The invention also provides a method of sterilizing an air flow comprising the steps of heating the air flow to a sufficient temperature to weaken cellular walls of microorganisms, inducing turbulence in the air flow, and providing in the air flow sufficient contact surface against which the microorganisms may hit and be destroyed at a flow rate and turbulence level of the air flow.

BRIEF DESCRIPTION OF THE DRAWINGS

The invention will be better understood by way of the following detailed description of a preferred embodiment of the invention with reference to the appended drawings in which.

DETAILED DESCRIPTION OF THE PREFERRED EMBODIMENT

Figure 1:
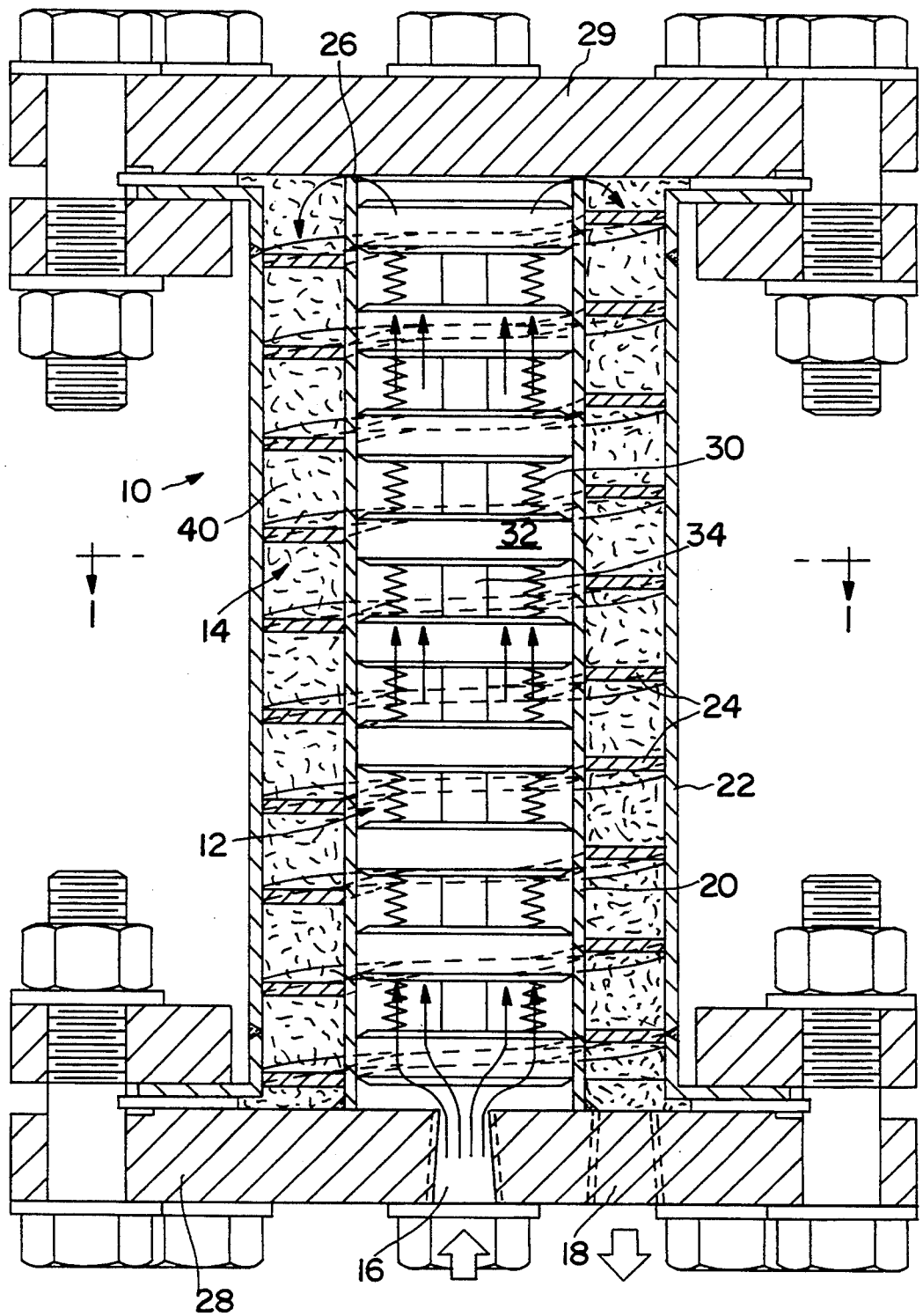
FIG. 1 is a break away side view of the preferred embodiment.
Figure 2:
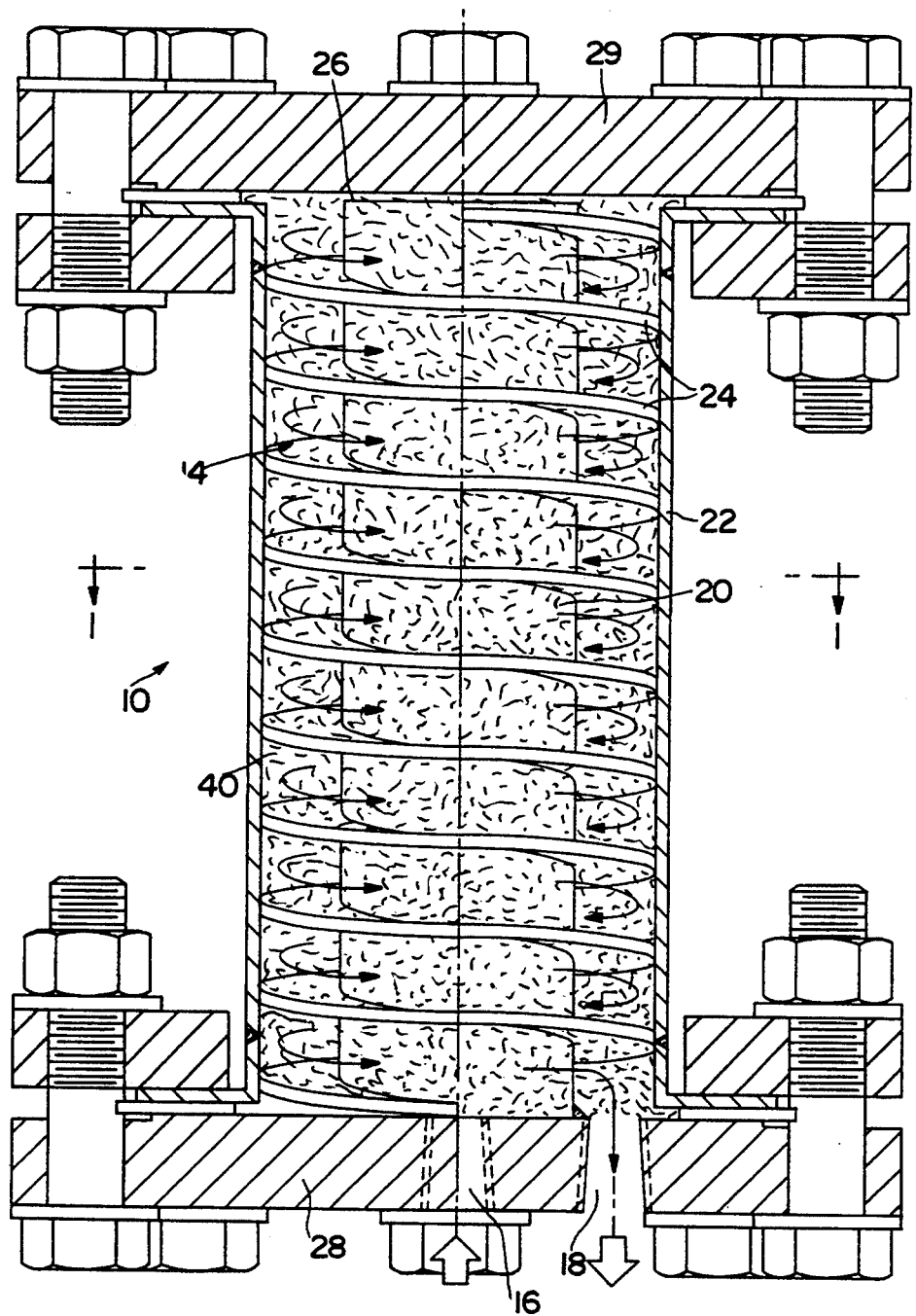
FIG. 2 is a side cross sectional view of the apparatus according to the preferred embodiment.
Figure 3:
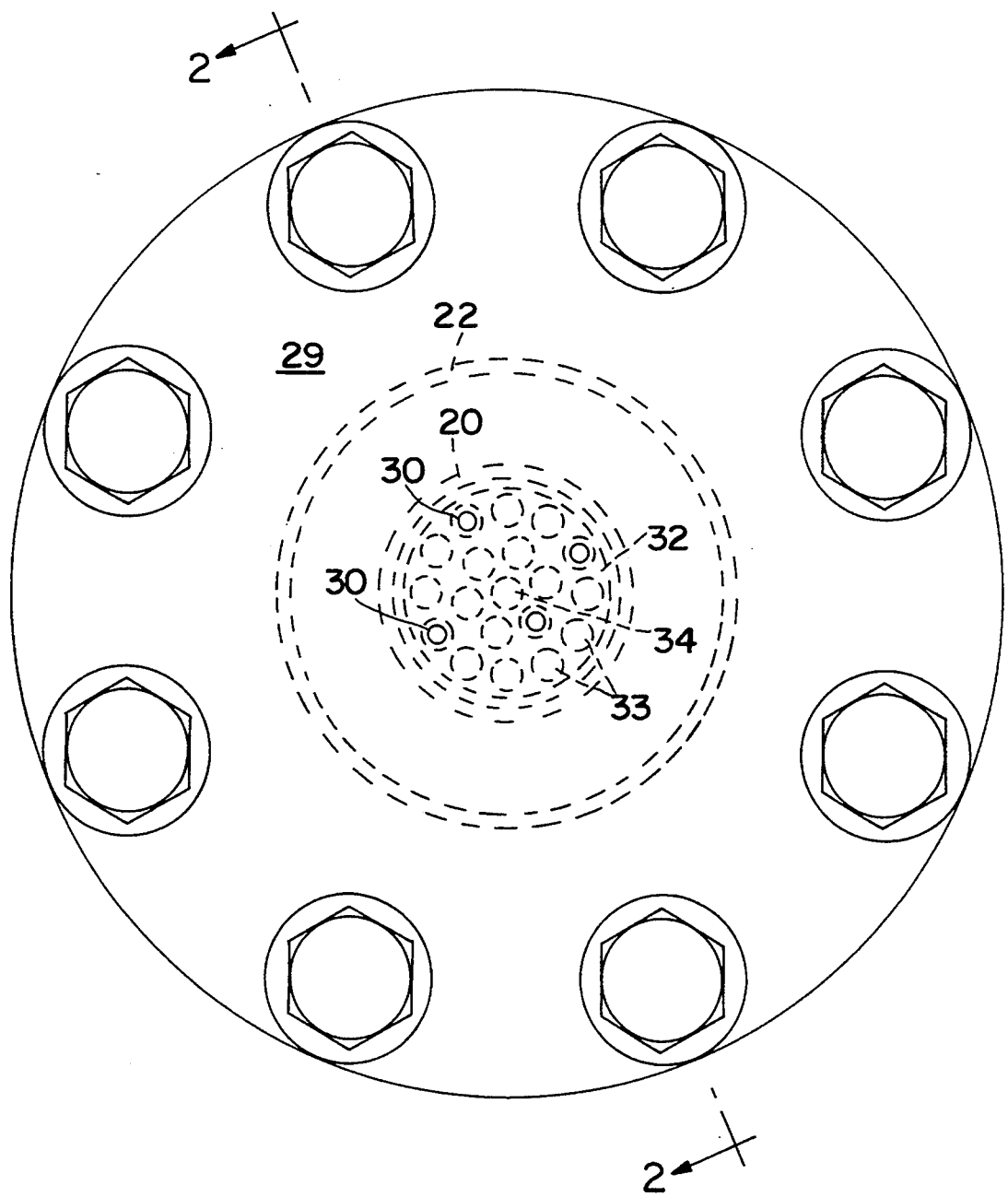
FIG. 3 is a break away top view of the preferred embodiment.

As shown in FIG. 1, apparatus (10) includes heating means (12) and turbulence means (14). An air inlet (16) provided in bottom plate (28) allows unsterilized air to enter into a chamber having a cylindrical wall (20), the air passing through a plurality of perforated ceramic disks (32) through which there is also provided a number of electrical resistance heating coils (30) which serve to heat the air to a predetermined temperature. A temperature sensor (not shown) can be provided at the top of the heater chamber to switch off coils (30) when the temperature is above the predetermined temperature. The heated air then flows through a gap between an upper end of cylindrical wall (20) and top plate (29), the gaps being referenced by reference numeral 26. The air flows into an upper part of a spiral chamber of turbulence means (14) defined by an outer cylindrical wall (22) a vertically descending horizontal spiralling wall member (24) and has as its inner wall the cylindrical wall (20) of the heater means (12). The preheated air passes through the outports (26) and the spiral chamber is filled with a filler material (40) which in the preferred embodiment is a stainless steel wool, although any inert turbulence inducing porous material may be used provided that the result is to create sufficient turbulence and contact surface against which the microorganism can hit and be destroyed at the given temperature and at the flow rate of air flow in the turbulence means (14). Clearly, the flow rate is determined by the flow into inlet (16) as well as the cross-sectional area of the spiral chamber which in the preferred embodiment is reduced by providing ten spirals as the air flows from the top of means (14) down to the bottom and out the outlet (18). The turbulence means (14) receive heat through cylindrical wall (20) to keep the spiral chamber warm. It is to be understood that the air is heated to a sufficient temperature which will weaken the cellular walls of the microorganisms and keep the microorganisms at such temperature as they flow through the turbulence means and hit against the contact surfaces provided in the turbulence means (14). As shown in FIG. 2, the spiral chamber (14) filled with stainless steel wool (40) allows the air to flow through the output (26) downwardly until it exits the outlet (18). As illustrated in FIG. 3, the cylindrical walls (22) and (20) are concentric and the ceramic perforated plates (32) contain an array of through holes (33) some of which have electrical resistance coils (30) passing therethrough, the disks (32) being interconnected by a central column (34).

Although the invention has been described above showing the turbulence means as comprising a spiral chamber, it would be possible to provide any chamber configuration in which the air flow in the turbulence means is sufficient to create a high enough incidence of collision between the microorganisms and the contact surface in order to result in destruction of all microorganisms at the predetermined elevated temperature where the microorganisms have a weakened cellular wall. The heater means and the turbulence means could also be integrated in the same chamber. While it is important that the heater means uniformly heat the air to guarantee that the air and the microorganisms have at least reached the predetermined temperature, the shape of the heater chamber and the means for heating the air may vary, for example it may be possible to inject steam into the air flow where moisture is required in the output air provided that the turbulence means are kept at a sufficient temperature to avoid accumulation of water as a result of condensation.

The invention was tested by flowing air through the apparatus (10), the air containing between 3 to 10 doses of 0.05 ml of a suspension containing about 115,000 spores of Bacillus stearothermophilus per ml (a very temperature resistant spore used commonly in testing of sterilization). At 20° C., the apparatus was ineffective in destroying the spores, thus showing that the device was not simply filtering the spores. At temperatures in a range of 125° C. to 175° C., all spores collected at the output of the apparatus were destroyed an no longer biologically active. The flow low rate for testing was 4 l/min, and it was shown that the apparatus could handle a much faster flow rate of 25 to 70 l/min. While the operation temperature for destroying spores is recommended to be in the range of 160° C. to 170° C., a suitable operating range can be determined by testing.

The air flow being sterilized may be from an air compressor supplying air at 2 to 8 atmospheres.

Although the invention has been described hereabove with respect to a preferred embodiment, it will be understood that either embodiments are contemplated within the scope of the present invention as defined in the appended claims.

What is claimed is:

1. A sterilization apparatus for a microorganism-containing air flow, the apparatus comprising:
 means for heating said air flow to a sufficient temperature to weaken cellular walls of microorganisms, said heating means comprising a cylindrical chamber having an outer cylindrical wall, and a plurality of electric resistance heating elements provided in said chamber, said chamber having an inlet port on one end and an outlet port at another end, and a turbulence means comprising a cylindrical spiral chamber having an inner wall defined by the outer cylindrical wall of the cylindrical chamber, and having one end communicating with said outlet port and another end said turbulence means including a turbulence promoting insert material; and
 said turbulence means being connected to said heating means for providing in said air flow turbulence and for providing contact surface against which said microorganisms hit and are destroyed at said temperature and at a flow rate of said air flow, said turbulence means having an outlet for said air flow containing destroyed microorganisms which communicates with said another end of said cylindrical spiral chamber.

2. The apparatus as claimed in claim 1, wherein said turbulence means comprise an inert metallic wool.

3. The apparatus as claimed in claim 1, wherein said turbulence means comprise inert pieces suitable to allow air to flow and induce sufficient turbulence to assure sufficient incidence of contact between said microorganisms and surfaces of said pieces at said flow rate.

4. The apparatus as claimed in claim 1, wherein said turbulence means further comprise an inert metallic wool disposed in said spiral chamber.

5. The apparatus as claimed in claim 1, wherein said turbulence means comprise inert pieces suitable to allow air to flow and induce sufficient turbulence to assure sufficiently high incidence of contact between said microorganisms and surfaces of said pieces at said flow rate.

6. The apparatus as claimed in claim 1, wherein said out port is provided in said outer cylindrical wall of said heating means, said inlet and said outlet being located at a same end of said apparatus.

7. The apparatus as claimed in claim 4, wherein said inlet and said outlet are located at a same end of said apparatus.

8. The apparatus as claimed in claim 1, wherein said heating means comprise a plurality of transverse perforated baffle plates in said cylindrical chamber for controlling said air flow through said cylindrical chamber to improve temperature uniformity in said air flow.

9. The apparatus as claimed in claim 1, wherein it further comprises means for setting said air flow at a pressure of about 2 to 8 atmospheres.

10. The apparatus as claimed in claim 1, wherein it further comprises means for setting said air flow at a pressure of about 2 to 8 atmospheres.

11. The apparatus as claimed in claim 1, wherein a volume of said spiral chamber of said turbulence means is approximately equal to a volume of said cylindrical chamber of said heating means, said spiral chamber having approximately ten turns.

12. The apparatus as claimed in claim 1, wherein it further comprises a compressed air supply, and said outlet is defining a supply of a sterilized air acceptable for medical or dental uses.

13. The apparatus as claimed in claim 10, wherein it further comprises a compressed air supply, and said outlet is defining a supply of a sterilized air acceptable for medical or dental uses.

14. A sterilization apparatus for a microorganism-containing air flow, the apparatus comprising:
 means for heating said air flow to a sufficient temperature to weaken cellular walls of microorganisms, wherein said heating means comprise a cylindrical chamber having an outer cylindrical wall, and a plurality of electric resistance heating elements provided in said chamber, said chamber having an inlet port on one end and an outlet port at another end;

turbulence means connected to said heating means for providing in said air flow turbulence and contact surface against which said microorganisms hit and are destroyed at said temperature and at a flow rate of said air flow, said turbulence means having an outlet for said air flow containing destroyed microorganisms, said turbulence means comprising a cylindrical spiral chamber having an inner wall defined by said outer cylindrical wall of said heating means and having one end communicating with said outlet port and another end communicating with said outlet, said turbulence means further comprising an inert metallic wool disposed in said spiral chamber.

* * * * *